INVENTOR
JOHN D. MENG
BY Samuel E. Turner
ATTORNEY

INVENTOR
JOHN D. MENG
BY
Samuel E. Turner
ATTORNEY

United States Patent Office 3,430,064
Patented Feb. 25, 1969

3,430,064

CRYOTRON LOGIC CIRCUIT

John D. Meng, Walnut Creek, Calif., assignor to General Electric Company, a corporation of New York Filed Nov. 22, 1965, Ser. No. 509,022
U.S. Cl. 307—212 3 Claims
Int. Cl. H03k 3/38, 19/30

ABSTRACT OF THE DISCLOSURE

This invention relates to a circuit formed by a plurality of cryotron switches disposed in parallel lines fed from a common source and including a plurality of cross-paths between corresponding adjacent pairs of said cryotrons, the cross-paths each including means for detecting the flow of supply current therein under modifiable conditions of the cryotrons in the parallel lines.

The invention relates to logic circuits and particularly to logic circuits which advantageously may be formed of networks of superconductive switches called cryotrons.

The logic circuit of the invention is useful in computing and data processing systems and it may be used, for example, to form an adder circuit.

Any logic circuits formed of cryotrons are now known, as shown for example, by John W. Bremer in "Superconductive Devices," McGraw-Hill Book Company, Inc., New York, 1962.

The object of the present invention is to provide a versatile logic circuit which makes efficient use of switching elements such as cryotrons.

This and other objects of the invention are achieved by connecting switching elements such as cryotrons in a current-directing bridge configuration to form the basic logic circuit of the invention. The current paths through the bridge are controlled by cryotrons to which the input signals are applied; and a current path across the arms of the bridge contains the control of an output cryotron by which a logical output signal is provided.

An extended form of the logic circuit of the invention and an adder circuit formed of a network of logic circuits according to the invention are illustrated herein and described in the following detailed description with reference to the accompanying drawing in which.

The logic circuits of the invention may advantageously be formed of a network of superconductive switches called cryotrons. Cryotrons are described in Chapter 2 of the previously mentioned "Superconductive Devices" by Bremer. An illustration of the thin-film form of a cryotron is shown by Bremer in FIG. 2.3. The symbolic representation of a cryotron is shown by Bremer in FIG. 3.3.

Briefly, a cryotron is represented symbolically herein as a circle crossed by a line. The circle represents the "gate" of the cryotron and the crossing line represents the "control." In the absence of a current in the control, the gate is superconductive. When a sufficient current is passed through the control, the resulting magnetic field renders the gate resistive.

The cryotron is thus a two-state device having a resistive gate when a control current is applied to the control thereof and a superconductive gate in the absence of a control current. To avoid resistive losses, cryotrons are advantageously employed in current directing circuits wherein parallel paths are provided for a supply current. When one of the paths is rendered resistive substantially all of the supply current is diverted or directed through the alternate superconductive path.

Figure 1:
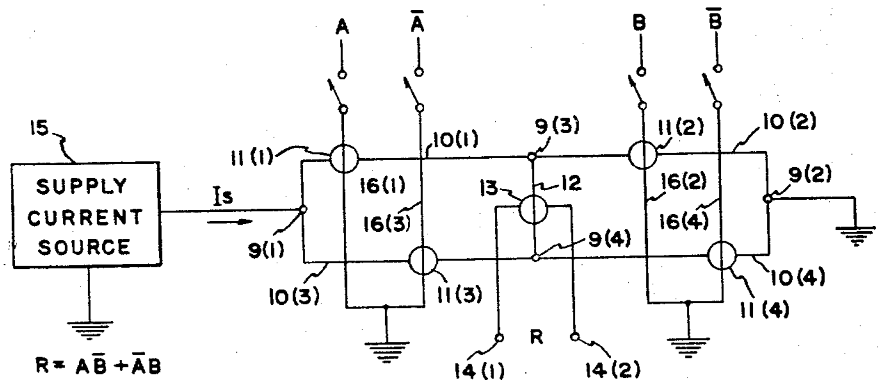
FIGURE 1 is a schematic diagram of the basic logic circuit of the invention.

The basic logic circuit of the invention, as formed of cryotron controlled superconductive current paths, is shown in FIG. 1. The current paths of the circuit are connected in a four-arm bridge configuration having bridge arms 10(1), 10(2), 10(3) and 10(4), each connected between a respective pair of bridge terminals 9(1)–9(4). Each of these bridge arms contains the gate of a respective one of four input cryotrons 11(1), 11(2), 11(3) and 11(4). A current path 12 across the bridge between terminals 9(3) and 9(4) contains the control of an output cryotron 13, the gate of which is connected in a line between a pair of output terminals 14(1) and 14(2). A current source 15 connected to bridge terminals 9(1) and 9(2) supplies a bridge current $I_s$ to the bridge circuit.

Input logic signals in the form of cryotron control currents may be applied to the circuit as follows: A current $I_a$ corresponding to a logic signal A is applied to a control line 16(1) which contains the control of cryotron 11(1); a current $\overline{I_a}$, corresponding to a logic signal $\overline{A}$ (logic signals A and $\overline{A}$ being mutually exclusive), is applied to a control line 16(3) which contains the control of a cryotron 11(3); a current $I_b$, corresponding to a logic signal B, is applied to a control line 16(2) which contains the control of cryotron 11(2); and, a current $\overline{I_b}$, corresponding to a logic signal $\overline{B}$ (logic signals B and $\overline{B}$ being mutually exclusive), is applied to a control line 16(4) which contains the control of cryotron 11(4).

An output signal R, indicative of the resistive state of cryotron 13 appears at the previously mentioned output terminals 14(1) and 14(2).

Operation of the circuit of FIG. 1 is as follows: In the absence of input logic signals the bridge current $I_s$ divides equally through opposite branches of the bridge (it being assumed that the inductances of the branches of the bridge are equal). If input logic signal A and/or input logic signal B are present (in the form of currents $I_a$ and/or $I_b$) the cryotron 11(1) and/or the cryotron 11(2) are resistive and the current $I_s$ is thus directed through branches 10(3) and 10(4). Similarly, if the input logic signals $\overline{A}$ and/or $\overline{B}$ (in the form of currents $\overline{I_a}$ and/or $\overline{I_b}$) are present, the current $I_s$ is directed through branches 10(1) and 10(2). In all of the foregoing cases, there is no net current flow in the path 12. Thus there is no resistance across the output terminals 14(1) and 14(2) and, therefore, no output signal R.

However, if input logic signals A and $\overline{B}$ are present, the current $I_s$ is directed through branch 10(3), path 12 and branch 10(2). Similarly, if input logic signals $\overline{A}$ and B are present, the current $I_s$ is directed through branch 10(1), path 12 and branch 10(4). In both of these cases, the cryotron 13 is rendered resistive thus constituting the output signal R across output terminals 14(1) and 14(2).

The basic circuit of FIG. 1 thus provides the well-known Exlusive-OR logic function which may be expressed in logic equation form as follows: $R=A\overline{B}+\overline{A}B$.

Figure 2:
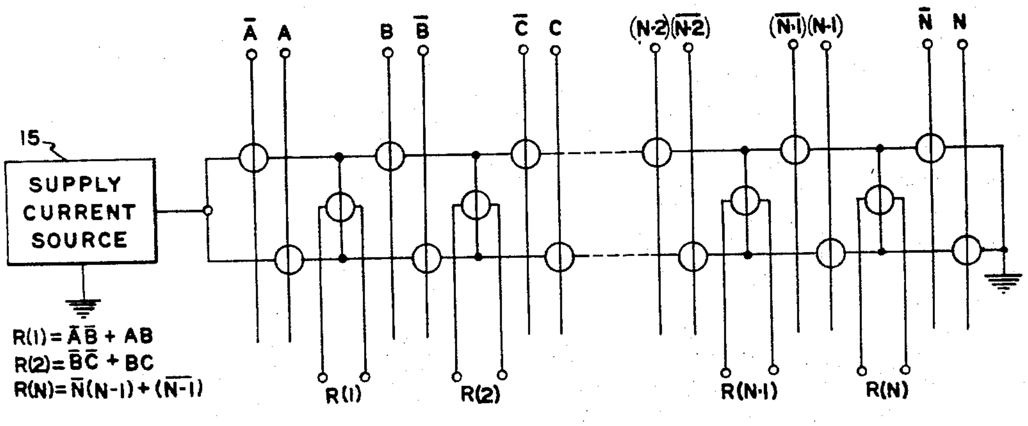
FIGURE 2 is a schematic diagram of an extended form of the logic circuit of the invention.

The basic circuit shown in FIG. 1 may be extended to provide a series of Exclusive-OR logic functions as illustrated in FIG. 2. In the general case, an output signal $R_n$ as a function of adjacent pairs of mutually-exclusive input signals may be expressed in logic equation form as follows:

$$Rn=(N-1)\overline{N}+(\overline{N-1})N$$

Figure 3:
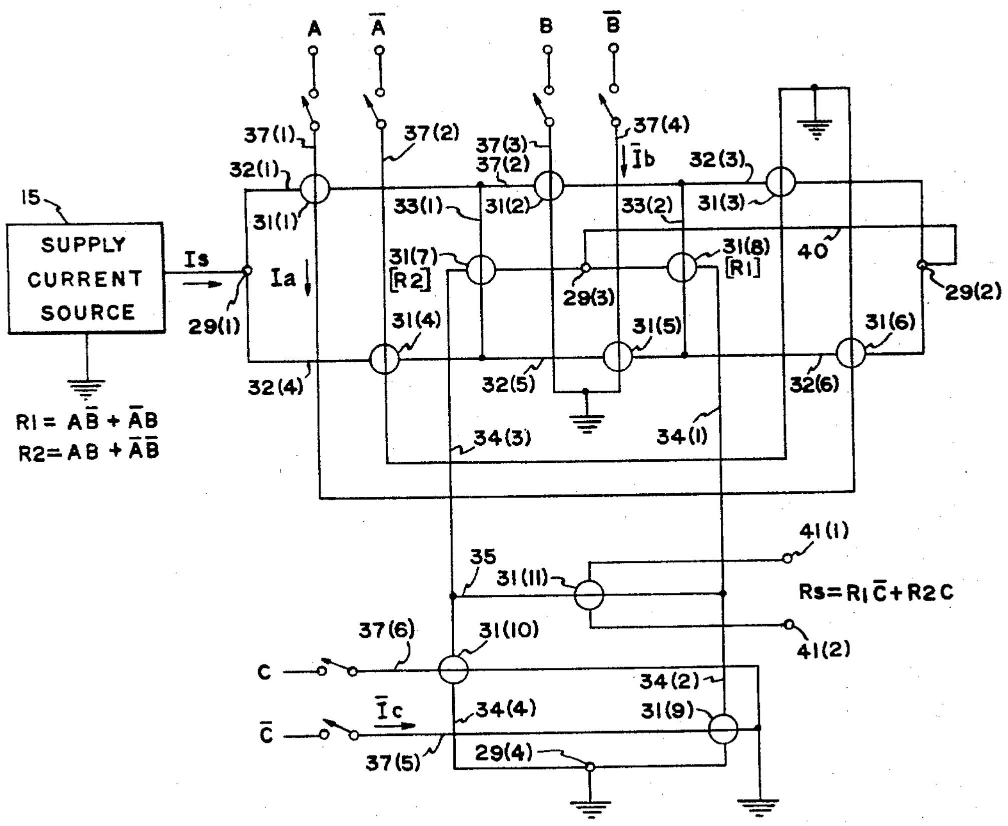
FIGURE 3 is a schematic diagram of an adder circuit formed of a network of logic circuits according to the invention.

As an example of use of the logic circuits of the invention a three-input adder circuit formed of such logic circuits is shown in FIG. 3. The adder circuit of FIG. 3 is adapted to combine three operand signals represented by three mutually exclusive signal pairs A and $\overline{A}$, B and $\overline{B}$, and C and $\overline{C}$. The operand signals A, $\overline{A}$ and B, $\overline{B}$ are combined in an extended bridge circuit comprising a plurality of cryotrons 31(1)–31(6) arranged in a network comprising a plurality of branches 32(1)–32(6) and a pair of cross-paths 33(1) and 33(2), each of the latter containing the control of a respective one of the crystrons 31(7) and 31(8).

The resistive state of cryotron 31(7) indicates a signal designated $R_1$ in accordance with the following logic equation: $R_1 - A\overline{B} + \overline{A}B$.

The resistive state of cryotron 31(8) indicates a signal designated $R_2$ in accordance with the following logic equation: $R_2 = \overline{A}\overline{B} + AB$.

Signals $R_1$ and $R_2$ are mutually exclusive and they will be recognized as the binary "1" and "0" sum signals, respectively, of the operands A, $\overline{A}$ and B, $\overline{B}$.

The signals $R_1$ and $R_2$ and signals C and $\overline{C}$ are combined in a bridge circuit comprise of a plurality of branches 34(1)–34(4) and a cross-path 35, the latter containing the gate of an output cryotron 31(11). The resistive state of cryotron 31(11) indicates a sum output signal R*s* of the adder circuit in accordance with the following logic equation: $Rs = R_1\overline{C} + R_2C$. The sum signal R*s* may be expressed in terms of the input operand signals as follows:

$$Rs = \overline{C}(A\overline{B} + \overline{A}B) + C(\overline{A}\overline{B} + AB)$$
$$= A\overline{B}\overline{C} + B\overline{A}\overline{C} + C\overline{A}\overline{B} + ABC$$

The following example illustrates the operation of the adder circuit of FIG. 3. Assume that operand signals A, $\overline{B}$ and $\overline{C}$ are applied to the adder circuit in the form of a current I*a* in a control line 37(1), a current $\overline{Ib}$ in a control line 37(4) and a current $\overline{Ic}$ in a control line 37(5). Under these conditions the supply current I*s* from source 15 is directed as follows: into a terminal 29(1), through branch 32(4) through cross-path 33(1), through branch 32(2), through branch 32(3), through a connecting line 40 between a pair of terminals 29(2) and 29(3), through branch 34(1), through cross-path 35, through branch 34(4), and thence to a terminal 29(4) which is connected to ground or to a supply current return line. The supply current I*s* through cross-branch 35 renders the gate of cryotron 31(11) resistive. This resistance may be detected as the sum signal R*s* at a pair of output terminals 41(1) and 41(2). The path of the supply current I*s* may be similarly followed through the adder circuit for other combinations of operand input signals.

Thus what has been described is a logic circuit formed of switching elements such as cryotrons connected in a current directing bridge configuration.

While the principles of the invention have been made clear in the illustrative embodiments, there will be obvious to those skilled in the art, many modifications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A logic circuit comprising: a pair of parallel connected current-conductive lines; means for applying a supply current to said lines; a plurality of current conductive cross-paths joining said lines; a plurality of switching elements in said lines, there being a switching element in each line on both sides of each cross-path, each said switching element having a selectable high and low impedance state; and means for detecting the flow of said supply current in each of said cross-paths.

2. A logic circuit comprising: a first plurality of cryotrons having the gates thereof connected in series; a second plurality of cryotrons having the gates thereof connected in series; means for applying a supply current in parallel to said first and second plurality of cryotrons; a plurality of superconductive cross-paths, each cross-path joining a junction between the gates of an adjacent pair of the cryotrons of said first plurality of cryotrons to the junction between the gates of the corresponding adjacent pair of cryotrons of said second plurality of cryotrons; and third plurality of cryotrons each having the control thereof connected in series with a respective one of said cross-paths.

3. An adder circuit comprising: a first bridge circuit comprising a first series of three cryotrons including first, second and third cryotrons having the gates thereof connected in series, a second series of three cryotrons including fourth, fifth and sixth cryotrons having the gates thereof connected in series, said first and second series being connected in parallel; a seventh cryotron having the control thereof connected between the junction of the gates of said first and second cryotrons and the junction of the gates of said fourth and fifth cryotrons; an eighth cryotron having the control thereof connected between the junction of the gates of said second and third cryotrons and the junction between the gates of said fifth and sixth cryotrons; a second bridge circuit comprising a third series of cryotrons including said eighth cryotron and a ninth cryotron having the gates thereof connected in series, a fourth series of cryotrons including said seventh and a tenth cryotron having the gates thereof connected in series, said third and fourth series being connected in parallel, and an eleventh cryotron having the gate thereof connected between the junction of the gates of said eighth and ninth cryotrons and the junction of the gates of said seventh and tenth cryotrons; means for applying a supply current to said first and second bridge circuits; first and second control lines, said first line containing the controls of said first and sixth cryotrons, said second control line containing the controls of said third and fourth cryotrons; means for applying a control current representative of the value of a first operand to one of said first and second control lines; third and fourth control lines, said third line including the control of said second cryotron, said fourth line including the control of said fifth cryotron; means for applying a control current representative of the value of a second operand to one of said third and fourth control lines; fifth and sixth control lines, said fifth line including the control of said ninth cryotron, said sixth control line including the control of said tenth cryotron; means for applying a control current representative of the value of a third operand to one of said fifth and sixth lines; and a pair of output terminals connected to the gate of said eleventh cryotron, the state of said eleventh cryotron being indicative of the sum of said first, second and third operands.

References Cited

UNITED STATES PATENTS

| | | | |
|---|---|---|---|
| 3,134,095 | 5/1964 | Heath | 307—88.5 |
| 3,175,197 | 3/1965 | Miller et al. | 307—88.5 |
| 3,255,362 | 6/1966 | Stowell | 307—88.5 |

ARTHUR GAUSS, *Primary Examiner.*

B. P. DAVIS, *Assistant Examiner.*

U.S. Cl. X.R.

307—216, 306